(12) United States Patent
Temkin et al.

(10) Patent No.: US 6,618,537 B2
(45) Date of Patent: Sep. 9, 2003

(54) OPTICAL WAVEGUIDE STRUCTURES AND METHODS OF FABRICATION

(75) Inventors: Henryk Temkin, Lubbock, TX (US); Rudolf Feodor Kazarinov, Lubbock, TX (US)

(73) Assignee: Applied WDM, Inc., Lubbock, TX (US)

(*) Notice: Subject to any disclaimer, the term of this patent is extended or adjusted under 35 U.S.C. 154(b) by 0 days.

(21) Appl. No.: 10/047,780

(22) Filed: Jan. 14, 2002

(65) Prior Publication Data

US 2003/0133682 A1 Jul. 17, 2003

(51) Int. Cl.[7] .......................... G02B 6/10; G02B 6/00; G02B 6/18; C03B 37/018
(52) U.S. Cl. ................... 385/132; 385/129; 385/141; 385/142; 385/144; 65/413; 65/423
(58) Field of Search ................. 385/129–132, 385/141–145; 65/413, 423

(56) References Cited

U.S. PATENT DOCUMENTS

| | | | | |
|---|---|---|---|---|
| 4,206,968 A | * | 6/1980 | Suganuma et al. | 385/127 |
| 4,871,221 A | * | 10/1989 | Imoto | 385/130 |
| 5,253,319 A | * | 10/1993 | Bhagavatula | 385/129 |
| 5,291,575 A | * | 3/1994 | Yanagawa et al. | 385/132 |
| 5,295,220 A | * | 3/1994 | Heming et al. | 385/142 |
| 6,031,957 A | * | 2/2000 | Suzuki et al. | 385/123 |
| 6,144,795 A | * | 11/2000 | Dawes et al. | 385/141 |
| 6,253,015 B1 | * | 6/2001 | Ukrainczyk | 385/129 |
| 6,341,190 B1 | * | 1/2002 | Summersgill et al. | 385/130 |
| 6,396,988 B1 | * | 5/2002 | Shimoda | 385/129 |
| 2002/0064360 A1 | * | 5/2002 | Makikawa | 385/130 |

OTHER PUBLICATIONS

"Chemical Vapor Deposition of Amorphous and Polycrystalline Thin Films," Coulson, Andrew R. et al., Silicon Processing for the VLSI Era vol. 1—Process Technology, title pg., pp. 161–196. (No Date).

"Refractive–index Dispersion of Phosphosilicate Glass, Thermal, Oxide, and Silicon Nitride Films on Silicon," Lee, H.J. et al., Applied Optics vol. 27, No. 19, Oct. 1988, pp. 4104–4109.

"13.7 Plasma–Enhanced CVD Dielectrics" "Campbell, Stephen A., The Science and Engineering of Microelectronic Fabrication (second edition)," Oxford University Press 2001, title pg., copyright pg., p. 343.

"Integrated Optic Adiabatic Devices on Devices on Silicon," Shani, Yosi et al., IEEE 1991, pp. 556–566.

"Efficient Coupling of a Semiconductor Laser to an Optical Fiber by Means of a Tapered Waveguide on Silicon," Shani, Y. et al., American Institute of Physics, 1989, pp. 2389–2391.

"Integrated Four–Channel Mach–Zehnder Multi/Demultiplexer Fabricated with Phosphorous Doped $SiO_2$ Waveguides on Si," Verbeek, B.H. et al., Journal of Lightwave Technology, vol. 6, No, 6, Jun. 1988, title page, pp. 1011–1015.

* cited by examiner

Primary Examiner—John D. Lee
Assistant Examiner—Tina M Lin
(74) Attorney, Agent, or Firm—Sharp Comfort & Merrett P.C.

(57) ABSTRACT

Methods of fabricating solid state optical waveguide structures comprising a doped silicon dioxide core layer sandwiched between lower and upper doped silicon dioxide cladding layers on a silicon substrate. The core and upper cladding layers are deposited using a plasma enhanced CVD process. The core layer is patterned to define one or more waveguide cores. The lower cladding layer is preferably also deposited using a plasma enhanced CVD process but alternatively may be formed by thermal oxidation.

18 Claims, 4 Drawing Sheets

OPTICAL WAVEGUIDE STRUCTURES AND METHODS OF FABRICATION

CROSS-REFERENCE TO RELATED APPLICATIONS

This application is related to application Ser. No. 10/047,779, filed on the same date as this application by Henryk Ternkin and Rudolf F. Kazarinov, entitled Optical Waveguide Structres, also assigned to Applied WDM, Inc., the disclosure or which is hereby incorporated by reference in the present application.

BACKGROUND OF INVENTION

This invention relates to solid state optical waveguide structures and to processes for fabricating them.

Optical waveguide structures based on silicon dioxide are used to prepare a variety of integrated optics devices. A typical waveguide structure includes a silicon substrate having three layers of silicon dioxide, each doped to produce a desired index of refraction and reflow properties. The first layer on the silicon substrate, called the lower cladding layer, typically comprises 10–15 microns of undoped silicon dioxide. The second layer, called the core layer, may comprise silicon dioxide doped with either phosphorus or germanium to increase its index of refraction relative to that of the lower cladding layer. The third, or upper layer of silicon dioxide, overlies the core layer and has an index of refraction close to that of the lower cladding layer and a thickness also in the range of 10–15 microns.

In many applications a single mode waveguide is desirable. This characteristic may be achieved by appropriate selection of the cross-section geometry and the index of refraction of the core layer. Typically, using a layered silicon dioxide structure, as described above, the cross-section of the core layer may be about 5 microns high and 7 microns wide. The preparation of the core layer of a single mode waveguide may involve deposition of a planar layer of core material on a silicon dioxide lower cladding layer. The core layer is then patterned and etched to form the desired geometry. The waveguide structure is completed by deposition of the upper cladding layer. The index of refraction of the core layer suitably exceeds that of the lower and upper cladding layers by about 0.01. This results in an optical mode that matches modes of most single-mode optical fibers and, at the same time, allows for the introduction of curved waveguide sections as may be needed in some device structures. Such curved sections must exhibit low propagation losses even with small radii of curvature (10–15 mm).

Two basic methods of fabricating such optical waveguide structures are typically employed. One is called flame hydrolysis in which sources of silicon dioxide and germanium dioxide, the latter used as a dopant, are injected into a hot torch flame. Fine particles of doped silica are formed in the flame of the torch and deposited on a cooler substrate. The flame may be rastered over a wafer in order to achieve uniform coverage. After deposition the core layer is annealed, at high temperatures, to form optical quality glass. All three layers may be formed, sequentially, in this manner. Since a flame is rastered over the wafer, very high precision motion is needed in order to obtain glass layers with uniform thickness and doping levels. These disadvantages become of particular concern when scaling up to process large wafer sizes and the process is significantly different from standard processes developed for silicon device fabrication.

The second method is based on chemical vapor deposition (CVD), typically implemented in conjunction with thermal oxidation. In this method, the lower cladding layer is formed either by high- pressure thermal oxidation of silicon, a process well established in semiconductor device processing and known as HIPOX, or by CVD. The core layer is formed by CVD of phosphorus doped silicon dioxide. In order to achieve the desired refractive index step between the core and cladding layers, it may be necessary to add as much as 8% of phosphorus, by weight, to the silicon dioxide. Once the core layer is formed, it is subjected to thermal anneal which produces optically transparent glass. Material prepared by this CVD process is known as P-Glass. The upper cladding layer is typically formed by introducing boron and phosphorus into a silicon dioxide CVD process to control the index of refraction and, at the same time, to make it possible to reflow the top cladding layer at a relatively low temperature.

Typically, a CVD method used to prepare optical waveguides relies on thermal decomposition of source gases. Low pressure in the deposition chamber minimizes gas phase reactions and assures thermal decomposition at the surface of the wafer. The core layer is deposited by thermal decomposition of silane ($SiH_4$) and nitrous oxide ($NO_2$), at a temperature of 450–500° C. in the presence of phosphine ($PH_3$) as a phosphorous source. The relatively low deposition temperature allows for high phosphorus concentration needed to form the effective core layer. However, boron cannot be introduced in this process. The preparation of the top cladding layer requires doping with boron and phosphorous, as mentioned above. Boron lowers the reflow temperature of the silicon dioxide and lowers the index of refraction. Co-doping with boron and phosphorous is used to simultaneously control the reflow temperature and the index of refraction. A convenient process developed for the preparation of boron and phosphorous doped silicon dioxide is CVD deposition from tetraethyloxysilane ($Si(OC_2H_5)_4$), also known as TEOS. Standard CVD deposition using TEOS requires a higher temperature, suitably 750–780° C. with trimethylborate (TMB) and trimethylphosphate (TMP) used as boron and phosphorous sources. The high deposition temperature needed in TEOS CVD does not permit incorporation of phosphorus at the concentration needed in the core layer. Thus CVD processes using different process parameters and source materials are required to form the core and upper cladding layers which is disadvantageous in terms of process control and time as well as economically. The lower cladding layer may be formed from undoped, thermally grown oxide. A layer of thermal oxide about 10 to 15 micron thick is typically needed in order to place the waveguide far enough above the silicon wafer to eliminate substrate-related losses. Because of the large thickness, this oxide layer is typically grown under conditions of high pressure (e.g. in excess of 10 atmospheres) and high temperatures (e.g. over 900° C.) for times longer than 100 hours.

SUMMARY OF THE INVENTION

In one aspect, the invention provides a method of fabricating an optical waveguide structure, comprising: forming on a silicon substrate an optical waveguide core between lower and upper cladding layers of silicon oxide, each of said core and said upper cladding layers formed by plasma enhanced chemical vapor deposition from silicon, oxygen and dopant containing atmospheres such that said core has a higher refractive index than the refractive indices of each of the lower and upper cladding layers sufficient to enable waveguiding of optical signals introduced into said core. Preferably, the lower cladding layer is formed by plasma enhanced chemical vapor deposition from silicon, oxygen and a dopant containing atmosphere, suitably containing boron and phosphorous dopant sources. Suitably, the lower and upper cladding layers each has a thickness of at least 15 microns and the core a thickness of about 5 microns. Typically, the core is formed by patterning a deposited layer and to enhance conforming the upper cladding layer to the patterned core, the upper cladding layer is preferably formed by a succession of alternating deposition and annealing steps to build up a final layer of desired thickness. The lower cladding layer may alternatively be formed by thermal oxidation of the silicon substrate.

In a preferred embodiment, a method of fabricating on a silicon substrate, a waveguide structure comprising an optical waveguide core between lower and upper cladding layers of silicon oxide, comprises: forming said lower cladding layer, an intermediate layer and said upper cladding layer by plasma enhanced chemical vapor deposition from silicon, oxygen and dopant containing atmospheres. The atmosphere for depositing each of the lower and upper cladding layers includes both boron and phosphorous dopant sources, and the atmosphere for depositing said intermediate layer includes a phosphorous dopant source such that said deposited intermediate layer has a refractive index about 0.01–0.014 higher than the refractive index of said lower cladding layer and the refractive index of said upper cladding layer. The intermediate layer is patterned to define said waveguide core with a desired configuration prior to forming the upper cladding layer which preferably is formed by a succession of alternating deposition and annealing steps to conformally flow said upper cladding layer around said waveguide core, to convert said waveguide core to optical quality glass, and to anneal the lower cladding layer. The deposited lower cladding layer provides optical isolation of said waveguide core from said silicon substrate and said upper cladding layer optically confines within the waveguide structure, optical signals introduced into said waveguide core. Preferably, said lower and upper cladding layers each has a thickness of at least 10 microns and said intermediate layer has a thickness of about 5 microns.

In one embodiment, a method according to the invention may be employed to fabricate an optical waveguide structure in which the lower and upper cladding layers each comprises annealed silicon dioxide doped with about 4% boron and about 2.5–5% phosphorous; and said intermediate layer comprises annealed silicon dioxide doped with about 8% phosphorous. However, advantageously, the upper and lower cladding layers may comprise annealed silicon dioxide doped with boron in the approximate range 9% to 11% and with phosphorous in the approximate range 2.5% to 3.5%, to enable single mode waveguide propagation of optical signals introduced into the core which is doped with about 8% phosphorous, such that the thermal coefficients of expansion of the upper and lower cladding layers match that of the silicon substrate and stress in the core is reduced close to zero or with low residual tensile stress to enable birefringence induced optical signal phase shift between TE and TM modes of propagation of an optical signal in said core layer not exceeding about 0.1 and preferably below about 06 nm. Such an optical waveguide structure is described in greater detail in copending application Ser. No. 10/047,779, filed on the same date as this application by Henryk Temkin and Rudolf F. Kazarinov, entitled Optical Waveguide Structures, also assigned to Applied WDM, Inc., the disclosure of which is hereby incorporated by reference in the present application.

DETAILED DESCRIPTION OF EMBODIMENTS OF THE INVENTION

An example of a fabrication process embodying the invention utilizes a plasma enhanced chemical vapor deposition (PECVD) process, for example as described by S. Wolf and R. B. Tauber in Chapter 6 of *Silicon Processing for the VLSI Era*, Volume 1, 1986, pages 161–197. Preferably, processing is carried out using a single wafer PECVD reactor (e.g. see pages 174 and FIG. 8b of the Wolf and Taub publication referenced above), but a multiple wafer PECVD reactor may be used as an alternative. In a single wafer PECVD reactor, a deposition rate of about 1 micron/minute is typical, permitting a high throughput of wafers with uniform, highly reproducible processing. Processing of wafers as large as 8" diameter is presently typical and 12" wafer processing capability is contemplated. A wafer is located in the reactor into which reactant gases are introduced and heated by internal heater(s) and an rf-induced glow discharge to transfer energy to the reactant gases, to implement a required chemical reaction, while allowing the wafer to remain at a relatively low temperature.

Figure 1A:
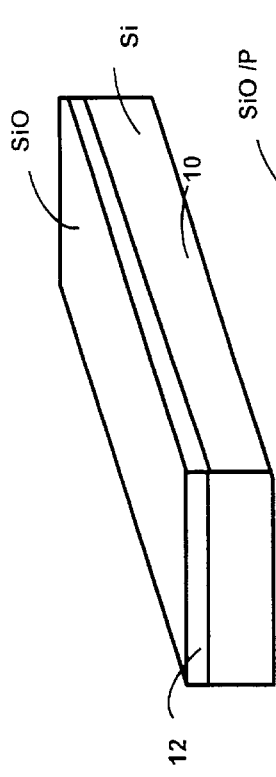
FIGS. 1a, 1b, 1c and 1d depict stages during fabrication of an optical waveguide structure using a process embodying the present invention.

For simplicity of illustration, only a single bar forming one of multiple bars incorporated on the wafer being processed is depicted in FIGS. 1a–1d and 2. FIG. 1a depicts a section of a silicon wafer providing a substrate 10 for an optical waveguide structure to be fabricated by a process embodying the present invention. A lower cladding layer 12 of silicon dioxide doped with boron and phosphorous is deposited on the substrate 10 by introducing tetraethyloxysilane (Si(OC2H5)4)—also known as TEOS—together with boron, typically introduced from trimethylborate (TMB), and phosphorous, typically introduced from trimetylphosphate (TMP), into the PECVD reactor heated to about 400–450° C. Under typical conditions of RF power, chamber pressure, and source fluxes used in the deposition of TEOS oxides in the silicon industry, a layer having a thickness of about 5 microns can be deposited in about 5 minutes.

Figure 1B:
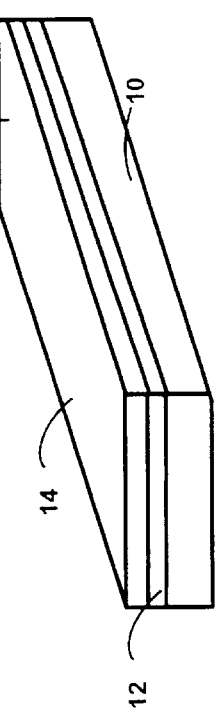
Figure 1C:
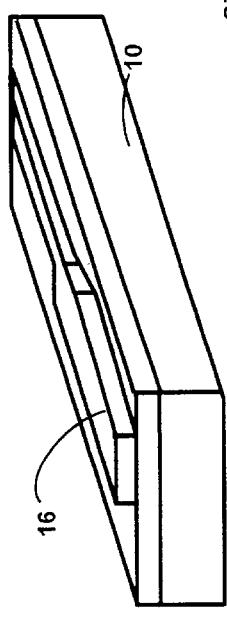

As shown in FIG. 1b, a layer 14 is then deposited on the lower cladding layer 12 by introducing reactant gases comprising TEOS and phosphorous, derived from TMP, into the PECVD reactor and heating to about 400–450° C. for a period of about 5 minutes to form a phosphorous doped silicon oxide layer 14 about 5 microns thick. The deposited layer 14 is then patterned by conventional lithography and dry etching to produce a waveguide core 16 having a desired configuration and suitably having a width and thickness of about 7×5 microns which can support single mode optical transmission along the waveguide core (FIG. 1c). It is to be understood that two or more waveguide cores having the same or different configurations could be formed in this manner if so desired. This structure is then annealed at about 1000° C. for about 1 hour to convert the core layer to optical quality transparent glass.

Figure 1D:
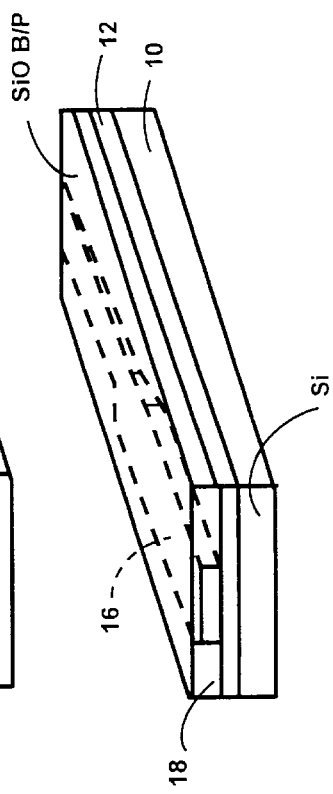
Figure 2:
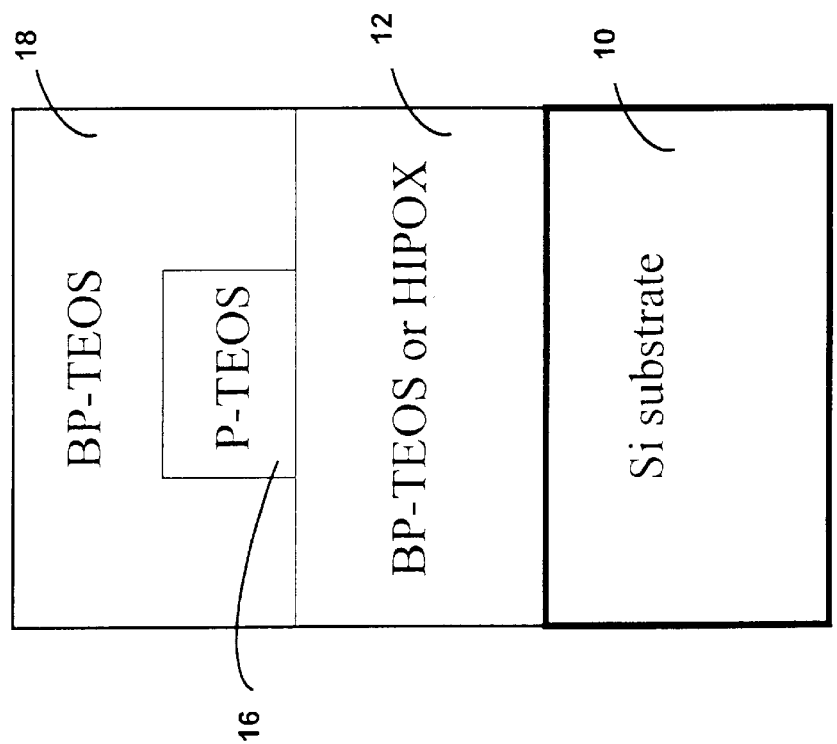
FIG. 2 depicts a cross section of a waveguide structure shown in FIG. 1d.

An upper cladding layer 18 of silicon dioxide is then deposited over the patterned waveguide core 16 by introducing reactant gases comprising TEOS, phosphorous, derived from TMP, and boron, derived from TMB, into the PECVD reactor and heating to about 400–450° C. to form an upper cladding layer 18 of BP-TEOS about 5 microns in thickness. The resultant structure is then heated at a temperature of about 950–1000° C. for about 30 minutes to 1 hour. The high temperature anneal transforms the layer into optical quality glass and reflows it to assure conformal coating of the underlying P-TEOS waveguide core layer. The deposition process is then repeated to form a second layer of BP-TEOS, also about 5 microns thick, with the same doping levels and optical properties as the first layer. The second layer is then reflowed during the second high temperature annealing step. A sequence of depositions and anneals is used in preference to the deposition of a single thick layer of BP-TEOS, followed by a single anneal, to provide a more uniform coverage of the underlying P-TEOS core layer. The final structure comprises the upper cladding layer 18 conformally reflowed around the stepped patterned waveguide core 16, as depicted in FIG. 1*d* and FIG. 2. One purpose of adding boron is to lower the reflow temperature of the upper cladding layer 16 to enhance the reflow process and smoothly cover the waveguide core 16.

A particular advantage of using a TEOS based PECVD process to form the core layer 16 is that TEOS provides a highly stoichiometric composition of silicon dioxide on which the index of refraction of silicon dioxide is dependent. While stoichiometric silicon dioxide has an index of refraction of n=1.4460, when measured with 1.55 micron wavelength, non-stoichiometric silicon dioxide exhibits refractive indices from about n=1.4 to n=1.7, depending on the relative proportions of silicon and oxygen. However, the stoichiometric material has the lowest optical loss. It is thus the preferred material for the fabrication of the core layer of waveguide structures in carrying out the present invention.

The low deposition temperature of PECVD TEOS makes it possible to incorporate phosphorus with a suitably high concentration. The phosphorus is retained in the as-deposited material during a high temperature anneal needed to transform it into high optical quality glass and the high phosphorus content produces glass with a suitably high index of refraction.

Figure 3:
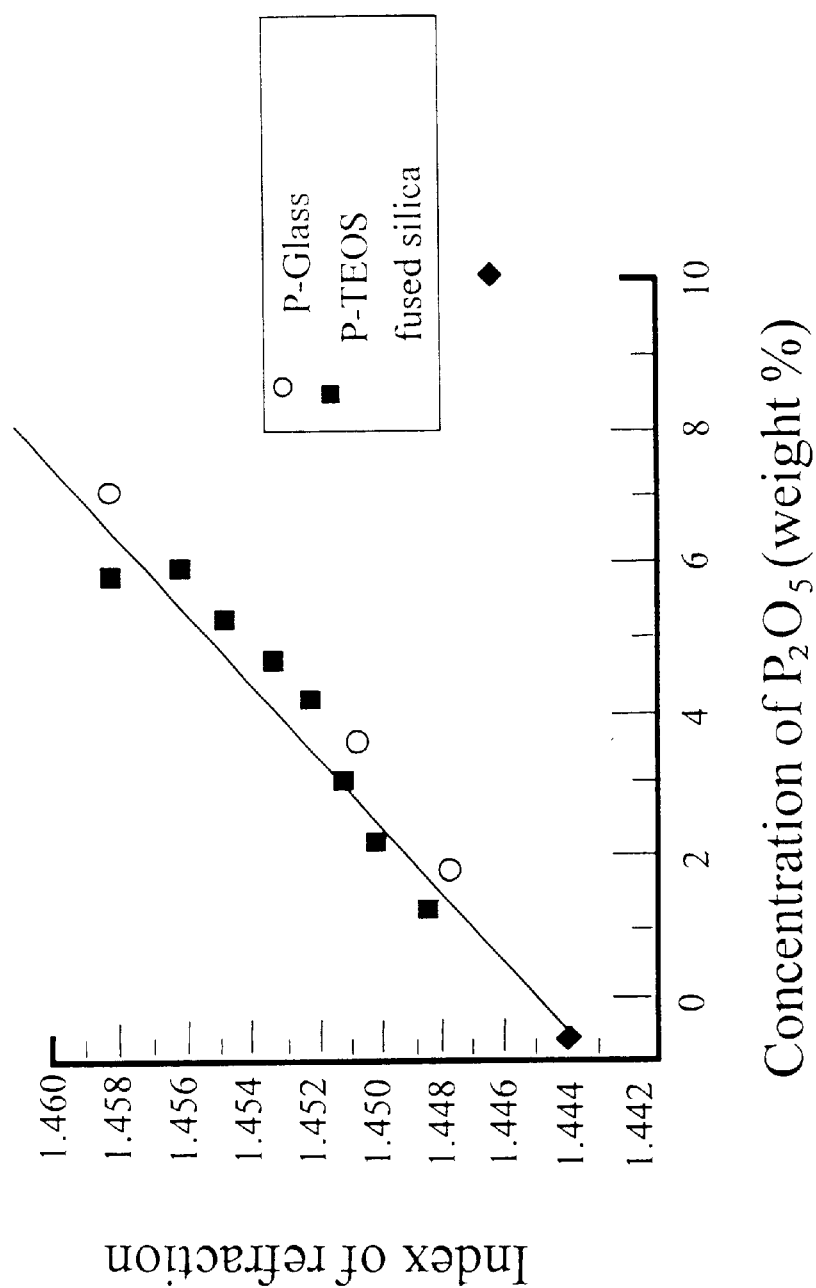
FIG. 3 is a plot of index of refraction of different types of glasses, including glass forming the core layer in a waveguide structure produced by a process embodying the present invention, against various concentrations of phosphorous in the glass.

FIG. 3 illustrates the dependence of the index of refraction of a phosphorous doped silicon dioxide core layer prepared using a PECVD-TEOS process embodying the invention. The dependence of the index of refraction of P-TEOS glass on the concentration of phosphorous, calibrated as the concentration of phosphorus by weight, is shown by rectangular symbols. The data was obtained on 5 micron thick layers of P-TEOS glass after annealing at a temperature of 1000° C. for 1 hour. The measurement of the index of refraction was carried out using a prism coupler technique with a 1550 nm laser [Metricon]. As shown in FIG. 3, the index of refraction is almost a linear function of the phosphorous concentration. Extrapolation of the index of refraction data to zero phosphorous concentration indicates an index of refraction equal to that of fused silica (n=1.444). This confirms good stoichiometry of the core layer material produced in accordance with the invention using a P-TEOS process as described above. In addition to the P-TEOS data, FIG. 3 also shows published data ("Refractive-index dispersion of phosphosilicate glass, thermal oxide, and silicon nitride films on silicon" H. J. Lee, C. H. Henry, K. J. Orlowsky, R. F. Kazarinov, and T. Y. Kometani, Applied Optics 27(19), 4104 (1988)) obtained with a conventional CVD P-Glass process. It is evident that PECVD P-TEOS glass matches the refractive index range of CVD P-Glass.

The refractive index difference between a core layer 16 produced by the PTEOS method, and lower and upper cladding layers 14, 18 doped to have a refractive index approximating that of fused silica can be as large as 0.014, obtained using a phosphorus concentration in the core layer of about 8% (see FIG. 3). This is sufficient to provide optical waveguiding in the core layer for most integrated optics applications.

Figure 4:
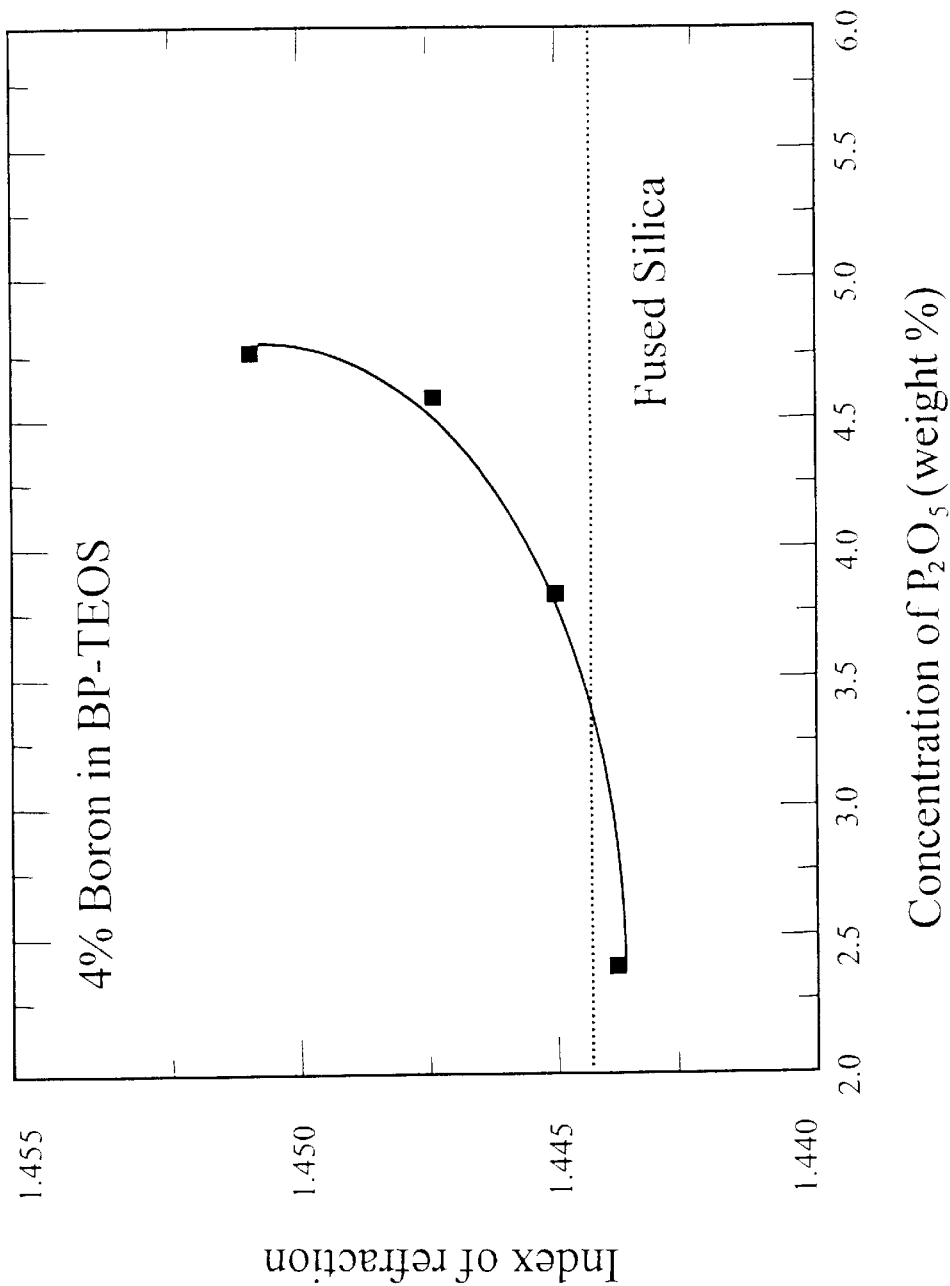
FIG. 4 is a plot of index of refraction of glass forming a cladding layer in a waveguide structure produced by a process embodying the present invention, against various concentrations of phosphorous and a particular concentration of boron in the cladding layer.

As well as enhancing the reflow characteristics of the upper cladding layer 18 as described above, boron is also added as a dopant for formation of the lower and upper cladding layers 14, 18 for index refraction matching purposes because while phosphorous increases the index of refraction, boron decreases the index. FIG. 4 shows the dependence of the index of refraction of BP-TEOS glass on the phosphorous concentration for a fixed 4% boron content. The refractive index of each of the lower and upper cladding layers 12 and 18 is required to be sufficiently less than that of the waveguide core 16 to ensure proper waveguiding of light along the core layer 16 in operation of the waveguide structure. In order to match the index of refraction of fused silica, phosphorous and boron concentrations of ~3% and 4% in both the lower and upper cladding layers 14, 18 have been determined to be suitable.

As described above, the PECVD TEOS process is preferably used to prepare both the lower and upper cladding layers 14 and 18, introducing both phosphorus and boron dopants. This material is known as BP-TEOS glass. In PECVD TEOS, the boron content is believed to be limited to less than 7% (see S. A. Campbell, "The Science and Engineering of Microelectronic Fabrication", Oxford Universirty Press, second edition, p.343). The concentration of boron used in BP-TEOS deposited silicon dioxide is typically chosen at about half the available range and the phosphorous content chosen to increase the index of refraction to match that of the lower cladding layer. For example, phosphorus and boron concentrations of, respectively, ~3% and 4% have been determined to be suitable. Small changes in the phosphorous concentration result in predictable changes in the index of refraction of PECVD BP-TEOS, as illustrated in FIG. 3. Preferably, the index of refraction of the cladding layer should differ from that of the core layer by about 1% to minimize transmission loss in the waveguide. Thus, in an advantageous embodiment of the invention, the entire waveguide structure comprising the core and cladding layers 16, 14, 18 can be fabricated by a PECVD TEOS process, providing a common basic process for depositing all three layers.

However, the inventors have discovered that to enable birefringence induced optical signal phase shift between TE and TM modes of propagation of an optical signal in said core layer to be reduced to levels not exceeding about 0.1, and preferably as low as 0.06 nm or even 0.2 nm for certain PLC applications, it is advantageous that the upper and lower cladding layers comprise annealed silicon dioxide doped with boron in the approximate range 9% to 11% and with phosphorous in the approximate range 2.5% to 3.5%, using a core doped with about 8% phosphorous, to enable single mode waveguide propagation of optical signals introduced into said core, such that the thermal coefficients of expansion of the upper and lower cladding layers match that of the silicon substrate and reduce stress in the core to close to zero or with low residual tensile stress. Methods embodying the present invention as disclosed herein may advantageously be employed in fabricating optical waveguide structures including core and upper and lower cladding layers having these modified doping levels.

The lower cladding layer 14 may alternatively be an undoped silicon dioxide layer formed by high pressure oxidation (HIPOX) of silicon. A phosphorous concentration of about 3% and a boron concentration of about 4% in the silicon dioxide upper cladding layer 18 provide the required reflow properties discussed above as well as a refractive index approximating that of thermally grown silicon dioxide (thermal oxide). Again, alternatively, in an alternative embodiment, the upper cladding layer may incorporate the modified boron and phosphorous doping levels described in the preceding paragraph.

About a 1% refractive index step has been determined to achieve low loss in the waveguide and make it possible to introduce curved sections having a radius of curvature as small as 15 mm without additional losses. A waveguide formed using a 1% refractive index step can have a core size and far field pattern readily matching those of standard optical fibers, thus permitting efficient coupling of such waveguide devices to optical fibers.

The PECVD TEOS process described above has significant advantages as compared to a thermal CVD process. In a thermal CVD process, batch processing is typically employed on many wafers (e.g. as many as fifty) at the same time with typical deposition rates of only about 1 micron/hour. Wafer size is limited to about 5 inch diameter, and wafer-to-wafer material uniformity is difficult to assure. In a single wafer PECVD TEOS process as employed in carrying out the present invention, the deposition rate may be about 1 micron/minute, resulting in much higher throughput of wafers, and processing of 8" wafers (with early prospect of 12" wafers) is possible. In addition, the process provides much more uniform and reproducible results than a batch process. Single wafer processes are also very clean and can yield much lower levels of defects, such as particles, than are achievable using a batch process.

Optical waveguide structures can be produced by a process embodying the invention with desirable properties, including exceptionally low optical transmission losses. In straight waveguides, optical losses lower than 0.02 dB/cm may be achieved, a result significantly better than reported using P-Glass core waveguides, or waveguides produced using flame hydrolysis. For example, a loss as low as 0.03 dB/cm, in a P-glass waveguide, was quoted in "Integrated Optic Adiabatic Devices On Silicon", Y. Shani, C. H. Henry, R. C. Kistler, R. F. Kazarinov, and K. J. Orlowsky, IEEE Journal of Quantum Electronics 27(3), 556 (1991). A process embodying the invention may also be used to fabricate various waveguide components used in integrated optics devices, e.g. tapered and curved waveguides. In tapered waveguide sections, in which the waveguide width was reduced from 30 microns to 7 microns over a distance of 1 mm, no additional loss as compared with a uniform 7 micron width waveguide was observed. In curved waveguide sections with a 12 mm radius, the additional radiative loss has been determined to be less than 0.03 dB/curve.

While particular embodiments of the invention have been described by way of example, modifications and variations are possible within the scope of the claims.

What is claimed is:

1. A method of fabricating an optical waveguide structure, comprising:

forming on a silicon substrate an optical waveguide core between lower and upper cladding layers of silicon oxide, each of said core and said lower and upper cladding layers formed by plasma enhanced chemical vapor deposition from silicon, oxygen and dopant containing atmospheres, deposition of said lower and upper cladding layer utilizing boron and phosphorous sources; annealing the waveguide core and the lower cladding layer such that the waveguide core is converted to optical quality glass, and forming the upper cladding layer by a succession of alternating deposition and annealing steps to conformally cover said waveguide core, to produce a waveguide structure such that said core has a higher refractive index than the refractive indices of each of the lower and upper cladding layers sufficient to enable waveguiding of optical signals introduced into said core.

2. A method according to claim 1, wherein lower and upper cladding layers comprise silicon dioxide doped with about 4% Boron and about 3% phosphorous.

3. A method according to claim 1, wherein the refractive index of said core is about 1.446 and is about 0.01 to 0.014 higher than the refractive index of both the looser and upper cladding layers.

4. A method according to claim 1, wherein the lower and upper cladding layers each has a thickness of at least 15 microns and said core has a thickness of about 5 microns.

5. A method of fabricating an optical waveguide structure comprising an optical waveguide core between lower and upper cladding layers of silicon oxide, comprising;

forming said core and said lower and upper cladding layers by plasma enhanced chemical vapor deposition from silicon, oxygen and dopant containing atmospheres, said dopant containing atmosphere for deposition of said lower and upper cladding layers including both boron and phosphorous sources; annealing the waveguide core and the lower cladding layer such that the waveguide core is converted to optical quality glass, and forming the upper cladding layer by a succession of alternating deposition and annealing steps to conformally cover said waveguide core, to produce a waveguide structure such that said core has a refractive index about 0.01 to 0.014 higher than the refractive index of said upper cladding layer, and said lower cladding layer has a refractive index substantially equal to that of said upper cladding layer, the difference in the refractive index of said core relative to that of said upper and lower cladding layers enabling waveguiding of optical signals introduced into said core, and wherein said lower and upper cladding layers provide optical confinement within the waveguide structure of optical signals introduced into said core.

6. A method of fabricating an optical waveguide structure comprising:

depositing on a silicon substrate by plasma enhanced chemical vapor deposition from a silicon, oxygen and dopant containing atmosphere, a lower cladding layer having a refractive index substantially equal to that of thermal oxide;

depositing on said lower cladding layer by plasma enhanced chemical vapor deposition from a silicon, oxygen and dopant containing atmosphere, a core layer having a refractive index higher than that of fused silica;

patterning said core layer to configure an optical waveguide core;

depositing on said lower cladding layer by plasma enhanced chemical vapor deposition from a silicon, oxygen and dopant containing atmosphere, an upper cladding layer overlying said optical waveguide core; said upper cladding layer having a refractive index substantially equal to that of fused silica;

annealing said lower cladding layer and said optical waveguide core to convert the waveguide core to optical quality glass, and forming the upper cladding layer by a succession of alternating deposition and annealing steps to conformally flow said upper cladding layer over said optical waveguide core enabling waveguiding of optical signals along and substantially confined within said waveguide core.

7. A method of fabricating an optical waveguide structure comprising an optical waveguide core between lower and upper cladding layers of silicon oxide, comprising:

forming said lower cladding layer, said core and said upper cladding layer by plasma enhanced chemical vapor deposition from silicon, oxygen and dopant containing atmospheres, deposition of said lower and upper cladding layer utilizing boron and phosphorous dopant sources, and said deposited core comprising a stoichiometric composition silicon dioxide waveguide core having a refractive index of substantially 1.446;

annealing the waveguide core and the lower cladding layer such that the waveguide core is converted to optical quality glass, and forming the upper cladding layer by a succession of alternating deposition and annealing steps to conformally cover said waveguide core, the dopant concentrations in said lower cladding layer and said upper cladding layer selected such that the refractive index of said core is greater than about 0.01 higher than the refractive index of said upper and lower cladding layers enabling waveguiding of optical signals alone and substantially confined within said core.

8. A method of fabricating an optical waveguide structure comprising an optical waveguide core between lower and upper cladding layers of silicon oxide, comprising:

forming said lower cladding layer, said core and said upper cladding layer by plasma enhanced chemical vapor deposition from silicon, oxygen and dopant containing atmospheres, the atmosphere for depositing each of the lower and upper cladding layers including both boron and phosphorous dopant sources such that said deposited layers each has a refractive index substantially equal to that of thermal oxide;

the atmosphere for depositing said waveguide core including a phosphorous dopant source such that said deposited waveguide core has a refractive index greater than about 0.01 higher than that of thermal oxide;

annealing the waveguide core and the lower cladding layer such that the waveguide core is converted to optical quality glass, and forming the upper cladding layer by a succession of alternating deposition and annealing steps to conformally cover said waveguide core, said deposited lower and upper cladding layers each having a thickness to optically confine optical signals introduced into said waveguide core within the waveguide structure comprising said lower and upper cladding layers and said waveguide core.

9. A method according to claim 8, wherein said lower and upper cladding layers comprise silicon dioxide doped with about 4% boron and about 3% phosphorous, and said waveguide core comprises silicon dioxide doped with about 8% phosphorous.

10. A method of fabricating an optical waveguide structure on a silicon substrate, said waveguide structure comprising an optical waveguide core between lower and upper cladding layers of silicon oxide, comprising:

forming said lower cladding layer by plasma enhanced chemical vapor deposition from silicon, oxygen, boron, and phosphorous containing atmosphere at a temperature within a selected range;

forming said core by patterning an intermediate layer on said lower cladding layer by plasma enhanced chemical vapor deposition from a silicon, oxygen, and phosphorous containing atmosphere at a temperature within said selected range;

annealing said lower cladding layer and said core to convert said core to optical quality glass;

forming the upper cladding layer by a succession of alternating deposition and annealing steps, said deposition steps each comprising plasma enhanced chemical vapor deposition from a silicon, oxygen, boron, and phosphorous containing atmosphere at a temperature within said selected range to conformally flow said upper cladding layer around upper and side surfaces of said waveguide core;

the phosphorous doped core having a refractive index greater than about 0.01 higher than the refractive index of the lower cladding layer and the refractive index of the upper cladding layer; and said deposited lower cladding layer providing optical isolation of said waveguide core from said silicon substrate and said upper cladding layer optically confining within the waveguide structure, optical signals introduced into said waveguide core.

11. A method according to claim 10, wherein said lower and upper cladding layers each has a thickness of at least 10 microns and said intermediate layer has a thickness of about 5 microns.

12. A method according to claim 10, wherein the lower and upper cladding layers each comprises silicon dioxide doped with about 4% boron and about 2.5–5% phosphorous, and said intermediate layer comprises silicon dioxide doped with about 8% phosphorous.

13. A method according to claim 10, wherein annealing the layers of the upper cladding layer is carried out at a temperature not exceeding that at which the lower cladding layer and core are annealed.

14. A method according to claim 13, wherein the refractive index of the core is substantialy 1.446.

15. A method according to claim 10, wherein said selected temperature range is 400–450° C., said lower cladding layer and core are annealed at about 1000° C. and the upper layers of the upper cladding layer are annealed at about 950–1000° C.

16. A method according to claim 10, wherein the lower and upper cladding layers each has a thickness of at least 15 microns and said core has a thickness of about 5 microns.

17. A method according to claim 10, wherein said selected temperature range is about 400–450° C., said lower cladding layer and core are annealed at about 1000° C. and the upper layers of the upper cladding layer are annealed at about 950–1000° C., and wherein the refractive index of the core is substantially 1.446.

18. A method according to claim 10, wherein said lower cladding layer, said core, and said upper cladding layer are deposited using a single wafer deposition process at a deposition rate of at east 1 micron per minute.

* * * * *